(12) United States Patent
Fiske (10) Patent No.: US 7,398,260 B2
(45) Date of Patent: Jul. 8, 2008

(54) EFFECTOR MACHINE COMPUTATION

(75) Inventor: Michael Stephen Fiske, San Francisco, CA (US)

(73) Assignee: Fiske Software LLC, San Francisco, CA (US)

( * ) Notice: Subject to any disclaimer, the term of this patent is extended or adjusted under 35 U.S.C. 154(b) by 460 days.

(21) Appl. No.: 10/791,249

(22) Filed: Mar. 2, 2004

(65) Prior Publication Data
US 2006/0259894 A1 Nov. 16, 2006

(51) Int. Cl.
*G06G 7/00* (2006.01)
*G06N 3/00* (2006.01)
*G06N 3/12* (2006.01)
*G06E 1/00* (2006.01)
*G06E 3/00* (2006.01)
*G06F 15/18* (2006.01)

(52) U.S. Cl. ............................ 706/39; 706/27; 706/13
(58) Field of Classification Search .................. 706/13, 706/15, 26–27, 38–39
See application file for complete search history.

(56) References Cited

U.S. PATENT DOCUMENTS

| | | | |
|---|---|---|---|
| 3,950,733 A | 4/1976 | Cooper et al. | |
| 4,660,166 A | 4/1987 | Hopfield | |
| 4,962,342 A | 10/1990 | Mead | |
| 5,155,802 A | 10/1992 | Mueller | |
| 5,325,464 A | 6/1994 | Pechanek | |
| 5,369,731 A | 11/1994 | Masumoto | |
| 5,422,983 A | 6/1995 | Castelaz | |
| 5,524,175 A | 6/1996 | Sato | |
| 5,524,176 A | 6/1996 | Narita | |
| 5,619,618 A | 4/1997 | Bigus | |
| 5,832,466 A * | 11/1998 | Feldgajer ..................... 706/13 |
| 6,049,793 A | 4/2000 | Tomita | |
| 6,256,619 B1 * | 7/2001 | Grichnik ..................... 706/27 |
| 6,332,137 B1 | 12/2001 | Hori | |
| 6,470,261 B1 * | 10/2002 | Ng et al. ..................... 706/15 |
| 6,601,053 B1 * | 7/2003 | Schaffer et al. ............. 706/13 |
| 6,751,601 B2 | 6/2004 | Zegers | |
| 6,754,645 B2 | 6/2004 | Shi | |
| 2003/0212645 A1 * | 11/2003 | Schaffer et al. ............. 706/26 |
| 2004/0128004 A1 | 7/2004 | Adams | |
| 2006/0277533 A1 | 12/2006 | Fiske | |
| 2007/0079108 A1 | 4/2007 | Fiske | |
| 2007/0288668 A1 | 12/2007 | Fiske | |

FOREIGN PATENT DOCUMENTS

WO   WO/2007/008519 A2   1/2007

OTHER PUBLICATIONS

Lindgren et. at. "Regular Language Inference Using Evolving Neural Networks" IEEE 1992.*
Elias, J.G. "Genetic Generation of Connection Patterns for a Dynamic Artificial Neural Network" IEEE 1992.*

(Continued)

*Primary Examiner*—Joseph P Hirl
*Assistant Examiner*—Benjamin Buss (57) ABSTRACT

An Effector machine is a new kind of computing machine. When implemented in hardware, the Effector machine can execute multiple instructions simultaneously because every one of its computing elements is active. This greatly enhances the computing speed. By executing a meta program whose instructions change the connections in a dynamic Effector machine, the Effector machine can perform tasks that digital computers are unable to compute.

51 Claims, 5 Drawing Sheets

OTHER PUBLICATIONS

Dasgupta et. al. "Designing Application-Specific Neural Networks using the Structured Genetic Algorithm" IEEE 1992.*

Schaffer et. at. "Combinations of Genetic Algorithms and Neural Networks: A Survey of the State of the Art" IEEE 1992.* de Garis,H. et al. "The CAM-Brain Machine (CBM): an FPGA-based hardware tool that evolves a 1000 neuron-net circuit module in seconds and updates a 75 million neuron artificial brain for real-time robot control" Neurocomputing. 2002.*

Siegelmann,H.T. et al. "Neural Networks and Analog Computation: Beyond the Turing Limit" pp. 29-33,153-164. Birkhäuser. 1999.*

Azam,F. "Biologically Inspired Modular Neural Networks" PhD Dissertation. Virginia Tech. May 2000.*

Mead,C. "Analog VLSI and Neural Systems" , 1989, pp. 36-39,37-81,208-209,260-263, Addison-Wesley, United States.*

Marian,I.D. "A biologically inspired model of motor control of direction" MS Thesis. University College Dublin, Ireland. Oct. 2002.*

Atsumi,M. "Artificial Neural Development for Pulsed Neural Network Design—A Simulation Experiment on Animat's Cognitive Map Genesis" IEEE. 2000.*

Hérault,L. "Optimization by pulsed recursive neural networks" IEEE. 1995.*

Gallagher,J.C. et al. "Continuous Time Recurrent Neural Networks: A Paradigm for Evolvable Analog Controller Circuits" IEEE. 2000.*

Floreano,D. et al. "Evolution of Spiking Neural Controllers for Autonomous Vision-Based Robots" 2001.*

G.E.P. Box, Evolutionary operation: A method for increasing industrial production, Applied Statistics, 1957, pp. 81-101 vol. 6, No. 2, Royal Statistical Society, England.

H.J. Bremerman, Optimization Through Evolution and Recombination, Self-Organizing Systems, 1962, pp. 93-106, Spartan Books, Washington D.C.

Carver Mead, Analog VLSI and Neural Systems, 1989, pp. 36-39, 67-81, 208-209, 260-263, Addison-Wesley, United States.

Wilrid Rall, Theoretical Significance of Dendritic Trees for Neuronal Input-Output Relations, The Theoretical Foundation of Dendritic Function, 1964, pp. 122-145, MIT Press.

Alan Turing, on Computable Numbers with an Application to the Entscheidungs problem, 1936, Proceedings London Mathematical Society, pp. 230-265, vol. 42, pp. 544-546, vol. 43, England.

George J. Friedman. Digital Simulation of an Evolutionary Process. 1959. pp. 171-184. vol. 4 of General Systems Yearbook.

W. W. Bledsoe. The use of biological concepts in the analytical study of systems. 1961. ORSA-TIMS National Meeting. San Francisco. pp. 1-25.

* cited by examiner

FIG. 1

Machine Structure used in Cyclic Graph Evolution

Internal Modules are labeled: $m_1, m_2, m_3, \ldots m_k$

FIG. 2

CGE Crossover

Before Crossover

After Crossover

- - - - - - - - - New External Connections

FIG. 3

Graph with Cycle

Graph with no Cycles

FIG. 4

Error Tolerance in Effectors

EFFECTOR MACHINE COMPUTATION

I. FEDERALLY SPONSORED RESEARCH

Not Applicable.

II. COMPUTER PROGRAM IMPLEMENTING A STATIC EFFECTOR MACHINE

Attached with this patent application are two identical CD-ROMs. The following files are in directory static_effector_machine:

| NAME | SIZE (bytes) | DATE OF CREATION |
|---|---|---|
| Machine.exe.txt | 905,295 | Mar. 16, 2003 |
| ExecutionParameters.xml.txt | 2,834 | Mar. 17, 2003 |
| MachineArchitecture.em.txt | 1,402 | Mar. 16, 2003 |
| MachineArchitectureSize.em.txt | 73 | Dec. 16, 2002 |
| MachineArchitectureTest.em.txt | 1,045 | Mar. 16, 2003 |
| MachineInputProgram.em.txt | 59 | Mar. 16, 2003 |
| MachineOutputProgram.em.txt | 1,430 | Mar. 16, 2003 |
| mainMachineExecution.cpp.txt | 1,717 | Mar. 17, 2003 |

The file machine.exe is a software implementation of a static Effector machine. machine.exe is able to run properly in a Windows environment or an emulated Windows environment, assuming that the files, ExecutionParameter.xml, MachineArchitecture.em, MachineArchitectureProgram.em, MachineArchitectureSize.em, and MachineInputProgram.em, are in the same directory as machine.exe.

The file mainMachineExecution.cpp is source code that demonstrates how to program and execute the program on a static effector machine using the first method. In the function main of this file, the values of the machine architecture are read from the file MachineArchitecture.em and the static program is read from the file MachineInputProgram.em. The executable file machine.exe executes this static program on the machine architecture. After machine.exe executes, it stores the firing representation of the out-put effectors in the file MachineOutputProgrm.em.

As proof of concept, the executable file machine.exe demonstrates the execution of a static Effector machine on a digital computer. However, the Effector machine realizes far greater computational power when its machine instructions are directly implemented in suitable hardware. A good hardware implementation should enable the Effector machine to execute computations more than four orders of magnitude faster than today's digital computers.

III. BACKGROUND—FIELD OF INVENTION

The Effector machine is a new kind of asynchronous computer. The Effector machine is not a digital computer. Its design has been influenced by Alan Turing's work in mathematics and computer science and Wilfred Rall's research in neurophysiology.

IV. ADVANTAGES OF INVENTION OVER PRIOR ART

In a standard digital computer, the only active computing elements are specialized registers in the microprocessor. Usually only one machine instruction can be computed at a time. This creates a computational bottleneck. The Effector machine overcomes this bottleneck because every computing element is active. When implemented in hardware, the Effector machine can execute multiple machine instructions simultaneously. This enormously increases the computing speed over current digital computers.

An Effector machine can be implemented in hardware built from circuits of transistors that operate subthreshold. This reduces the amount of power consumed by more than 5 orders of magnitude. Further, the amount of heat produced is greatly reduced, compared to a digital computer.

Executing a meta program whose instructions change the connections in a dynamic Effector machine, enables the Effector machine to perform tasks that digital computers are unable to compute.

V. DETAILED DESCRIPTION OF INVENTION

1. Introduction

An Effector machine consists of computing elements called effectors. There are three kinds of effectors: Input, Computational and Output effectors. Input effectors receive information from the environment, another Effector machine, or a program. Computational effectors receive messages from the input effectors and other computational effectors firing activity and transmit new messages to computational and output effectors. The output effectors receive messages from the input and computational effectors firing activity. The firing activity of the output effectors represents the output of the Effector machine. Every effector is an 'active element' in the sense that each one can receive and transmit messages simultaneously.

This paragraph describes the fundamental method of computation of a static Effector machine. Each effector receives messages, formally called pulses, from other effectors and itself and transmits messages to other effectors and itself. If the messages received by effector, $E_i$, at the same time sum to a value greater than the threshold, then effector $E_i$ fires. When an effector $E_i$ fires, it sends messages to other effectors. There are three kinds of effectors, computational, output and input effectors.

2. Machine Architecture

Definition 2.1 Static Machine

The variables $\Gamma, \Lambda, \Delta$ represent index sets, used to index the input, computational, and output effectors, respectively. Depending on the particular machine architecture, it is possible for the intersections $\Gamma \cap \Lambda$ and $\Lambda \cap \Delta$ to be empty or non-empty. A static machine $\mathfrak{M}(\mathfrak{I}, \mathfrak{E}, \mathfrak{O})$ consists of a collection of input effectors, denoted as $\mathfrak{I}=\{E_i: i \in \Gamma\}$; a collection of computational effectors $\mathfrak{E}=\{E_i: i \in \Lambda\}$; and a collection of output effectors $\mathfrak{O}=\{E_i: i \in \Delta\}$. Each computational and output effector, $E_i$, has the following elements:

A threshold $\theta_i$.

A refractory period $r_i$, where $r_i > 0$.

A collection of pulse amplitudes, $\{A_{ki}\}_{k \in \Gamma \cup \Lambda}$.

A collection of pulse widths, $\{\omega_{ki}\}_{k \in \Gamma \cup \Lambda}$, where $\omega_{ki} > 0$ for all $k \in \Gamma \cup \Lambda$.

A collection of transmission times, $\{\tau_{ki}\}_{k \in \Gamma \cup \Lambda}$, where $\tau_{ki} > 0$ for all $k \in \Gamma \cup \Lambda$.

A function of time, $\psi_i(t)$, representing the time effector i last fired. $\psi_i(t) = \text{supremum}\{s \in \mathbb{R}: s<t \text{ AND } g_i(s)=1\}$.

A set of recent firing times of Effector k within Effector i's integrating window, $\mathfrak{F}_{ki}(t)=\{s \in \mathbb{R}: \text{Effector k fired at time s and } 0 \leq t-s-\tau_{ki}<\omega_{ki}\}$. Let $|\mathfrak{F}_{ki}(t)|$ denote the number of elements in the set $\mathfrak{F}_{ki}(t)$. If $\mathfrak{F}_{ki}(t)$ is the empty set, then $|\mathfrak{F}_{ki}(t)|=0$.

A collection of input functions, $\{\phi_{ki}(t)\}_{k\in\Gamma\cup\Lambda}$, each a function of time, and representing pulses coming from computational effectors, and input effectors. $\phi_{ki}(t)=|\mathfrak{F}_{ki}(t)|A_{ki}$.

An output function, $g_i(t)$, representing whether the effector fires at time t.

$$g_i(t) = \begin{cases} 1 & \text{if} \quad \sum_{k\in\Gamma\cup\Lambda} \phi_{ki}(t) > \theta_i \text{ AND } (t - \psi_i(t)) \geq r_i. \\ 0 & \text{otherwise.} \end{cases}$$

An effector, $E_i$, can be an input effector and a computational effector. Likewise, an effector can be an output effector and a computational effector.

As defined above, when an output effector, $E_i$, is not a computational effector, $i\in\Delta\cap A$, $E_i$ does not send pulses to effectors in this machine. This is captured formally by the fact that the index k for the transmission times, pulse widths, pulse amplitudes, and input functions lies in $\Gamma \cup \Lambda$.

Input effectors that are not computational effectors have the same characteristics as computational effectors, except they have no input functions, $\phi_{ki}(t)$, coming from effectors in this machine. In other words, they don't receive pulses from effectors in this machine. Input effectors are assumed to be externally firable. An external source such as the environment or an output effector from another distinct machine $\mathfrak{M}(\mathfrak{I}', \mathfrak{E}', \mathfrak{D}')$ can cause an input effector to fire. The input effector can fire at any time as long as this time minus the time the input effector last fired is greater than or equal to the input effector's refractory period.

Next, some vocabulary about the machine architecture is presented. If $g_i(t_0)=1$, this means effector i fired at time $t_0$. The refractory period, $r_i$, is the amount of time that must elapse after effector $E_i$ just fired before $E_i$ can fire again. The transmission time, $\tau_{ki}$, is the amount of time it takes for effector $E_i$ to find out that effector $E_k$ has fired. The pulse amplitude, $A_{ki}$, represents the strength of the pulse that effector k transmits to effector i after effector k has fired; after this pulse reaches $E_i$, the pulse width $\omega_{ki}$ represents how long the pulse lasts as input to effector $E_i$.

The expression connection from k to i represents the triplet $(A_{ki}, \omega_{ki}, \tau_{ki})$. If $A_{ki}=0$, then one says that there is no connection from effector k to effector i; if $A_{ki}\neq 0$, then one says there is a non-zero connection from effector k to effector i.

Definition 2.2 Dynamic Machine

A dynamic machine has the same definition as a static machine, except the connections, $(A_{ki}(s),\omega_{ki}(s),\tau_{ki}(s))$ change over time. Each of the connection variables is written as a function of s, which is a parameter for time. Thus, the pulse amplitudes, pulse widths and transmission times may change over time.

Stated in a more precise manner, replace the static machine definition of recent firing times with $\mathfrak{F}_{ki}(t)=\{s\in\mathbb{R}:$ Effector k fired at time s and $0\leq t-s-\tau_{ki}(s)<\omega_{ki}(s)\}$.

Furthermore, replace the static machine definition of input functions with the definition $$\phi_{ki}(t) = \sum_{s\in\mathfrak{F}(t)} A_{ki}(s),$$

where $\{\phi_{ki}(t)\}_{k\in\Gamma\cup\Lambda}$ is a collection of input functions.

3. Firing Representation of Effectors

Consider effector $E_i$'s firing times $F(E_i)=\{s: g_i(s)=1\}$. If $E_i$'s refractory period is greater than zero, arrange the elements of the set $F(E_i)$ into a sequence $[s_0, s_1, s_2, \ldots]$, where $s_0<s_1<s_2<\ldots$.

Definition 3.1 Firing Representations

Consider the interval of time $W=[t_1, t_2]$. Let $s_m$ be the smallest element lying in W, and $s_n$ the largest element lying in W. Then $E_i$'s firing sequence within the window of computation W is $F(E_i, W)=[s_m, s_{m+1}, \ldots, s_n]$, where $s_m< s_{m+1} < \ldots < s_{n-1} < s_n$, and $$\bigcup_{k=m}^{n} \{s_k\} = \{s \in W : g_i(s) = 1\}.$$

The sequence $F(E_i, W)$ is called a firing representation of the effector $E_i$ over the interval of time W. With a collection of effectors $\{E_0, E_1, E_2, \ldots\}$, create the infinite tuple $(F(E_0, W), F(E_1, W), F(E_2, W), \ldots)$. The infinite tuple $(F(E_0, W), F(E_1, W), F(E_2, W)\ldots)$ is called a firing representation of the effectors $\{E_0, E_1, E_2, \ldots\}$ over the window of computation W.

At a fundamental level of interpretation, firing representations express the input to, the computation of, and the output of an Effector machine. At a more abstract level, firing representations can represent an input symbol, an output symbol, a sequence of symbols, a number, or even a sequence of program instructions.

EXAMPLE 3.2

For each real number x in [0,1], there exists a distinct firing representation of effectors $\{E_0, E_1, E_2, \ldots\}$ over a finite interval of time.

Proof: Let $\gamma>0$ be a finite real number. Choose the interval of time for each effector to be $[0, \gamma]$. For any time $t<0$, there are no restrictions on when effectors $E_i$ fired. With this in mind, for each i choose the refractor period $r_i=\gamma/2$ so that it is possible for effector $E_i$ to fire or to not fire during the interval of time $[0, \gamma]$. The sequence $(b_0, b_1, b_2, b_3, \ldots)$ is a binary representation of a real number x in [0, 1]. If $b_i=1$, then choose $E_i$ to fire at least once during the interval of time $[0, \gamma]$. If $b_i=0$, then choose $E_i$ to not fire during the interval of time $[0, \gamma]$. This shows the existence of a firing representation for x. To show distinctness, verify that if $x\neq y$, then the firing representation for x is distinct from the firing representation for y. Let $(b_0, b_1, b_2, b_3, \ldots)$ denote the binary representation for x and $(c_0, c_1, c_2, c_3, \ldots)$ denote the binary representation for y. Since $x\neq y$, then $c_k \neq b_k$ for some k. In the first case, $b_k=0$ and $c_k=1$. (The analysis for the other case $b_k=1$ and $c_k=0$ is apparent from symmetry.) By our method of construction, the $E_k$ effector for x does not fire during the interval of time $[0, \gamma]$; and the $E_k$ effector for y fires during the interval of time $[0, \gamma]$. Thus, the firing representations for x and y are distinct. □

Definition 3.3 Sequence of Firing Representations $\mathfrak{E}=\{E_0, E_1, E_2, \ldots\}$ denotes a collection of effectors. Let $W_1, W_2, W_3, \ldots, W_n$ be a sequence of time intervals. Let $F(\mathfrak{E}, W_1)=(F(E_0, W_1), F(E_1, W_1), F(E_2, W_1), \ldots)$ be a firing representation over the interval $W_1$. Let $F(\mathfrak{E}, W_2)=(F(E_0, W_2), F(E_1, W_2), F(E_2, W_2), \ldots)$ be a firing representation of the effectors $\{E_0, E_1, E_2, \ldots\}$ over the interval of time $W_2$. In general, let $F(\mathfrak{E}, W_i)=(F(E_0, W_i), F(E_1, W_i), F(E_2, W_i), \ldots)$ be the firing representation over the interval of time $W_i$. From these one can create a sequence of firing representations, $F(\mathfrak{E}, W_1), F(\mathfrak{E}, W_2), F(\mathfrak{E}, W_3), \ldots, F(\mathfrak{E}, W_n)$.

4. Machine Computation

Definition 4.1 Machine Computation

Let $F(\mathcal{E}, W_1), F(\mathcal{E}, W_2), F(\mathcal{E}, W_3), \ldots, F(\mathcal{E}, W_n)$ denote a sequence of firing representations. Let $F(\mathcal{E}, S_1), F(\mathcal{E}, S_2), F(\mathcal{E}, S_3), \ldots, F(\mathcal{E}, S_n)$ be a sequence of firing representations. If there exists a machine architecture for an Effector machine whose input effectors with a sequence of firing representations $F(\mathcal{E}, S_1), F(\mathcal{E}, S_2), F(\mathcal{E}, S_3), \ldots, F(\mathcal{E}, S_n)$, generate with its output effectors $F(\mathcal{E}, W_1), F(\mathcal{E}, W_2), F(\mathcal{E}, W_3), \ldots, F(\mathcal{E}, W_n)$, then one says that the machine computes $F(\mathcal{E}, W_1), F(\mathcal{E}, W_2), F(\mathcal{E}, W_3), \ldots, F(\mathcal{E}, W_n)$ Definition 4.2

An Effector machine is an interpretation between two sequences of firing representations if the machine can compute the output sequence of firing representations from the input sequence of firing representations.

When using a dynamic machine, it is possible to use a distinct machine architecture for each distinct sequence of firing representations described in Definition 4.2.

Definition 4.3 Static Program $\mathcal{M}(\mathcal{I}, \mathcal{E}, \mathcal{O})$ denotes an Effector machine. $\mathcal{M}$ can be a static or dynamic machine. A static program is a sequence of firing representations presented to $\mathcal{M}(\mathcal{I}, \mathcal{E}, \mathcal{O})$'s input effectors, $\mathcal{I}$.

A meta-program determines how to change a dynamic machine's architecture as it executes.

Definition 4.4 Meta Program $\mathcal{M}(\mathcal{I}, \mathcal{E}, \mathcal{O})$ denotes a dynamic machine. For each j, the symbol $x^j$ is the symbol A, $\omega$ or $\tau$, representing a pulse amplitude, a pulse width or a transmission time, respectively. A meta-program is a finite sequence of quintuples $[(x^1, k_1, i_1, v_1, t_1), (x^2, k_2, i_2, v_2, t_2), \ldots, (x^n, k_n, i_n, v_n, t_n)]$ where each $t_j$ represents a time and $t_1 < t_2 < \ldots < t_n$. For each j, where $1 \leq j \leq n$, the quintuple, $(x^j, k_j, i_j, v_j, t_j)$, instructs $\mathcal{M}(\mathcal{I}, \mathcal{E}, \mathcal{O})$ to assign the value $v_j$ to connection element, $x^j_{k_j i_j}$, at time $t_j$. In particular, at time $t_1$, connection element, $x^1_{k_1 i_1}$, is assigned the value $v_1$. If $x^1$ is the symbol A, then pulse amplitude $A_{k_1 i_1}$ is assigned the value $v_1$ at time $t_1$. Similarly, at time $t_2$, connection element, $x^2_{k_2 i_2}$, is assigned the value $v_2$. If $x^2$ is the symbol $\omega$, then pulse width $\omega_{k_2 i_2}$ is assigned the value $v_2$ at time $t_2$.

Example of Programming an Effector Machine

In the enclosed CD-rom, there is a file MachineInputProgram.em that contains an example of a Static program. The first line of this Static program has 0 in the time column and 0 in the effector column. The first line instructs that input effector 0 is fired at time 0. The second line has a 5 in the time column and a 0 in the effector column. This second line instructs that input effector 0 is fired at time 5. The last instruction is on the third line. The third line instructs that input effector 0 is fired at time 11. The simple static program in MachineInputProgram.em helps illustrate how a static program is interpreted by a static Effector machine. Longer more complex static programs can also be executed with machine.exe.

In the file MachineOutputProgram.em, the first line of this static program has a 3.00 in the time column and 0 in the effector column. The first line means that output effector 0 fired at time 3.00. The second line of this static program has a 4.00 in the time column and 0 in the effector column. The second line means that output effector 0 fired at time 4.00. The rest of the lines in file MachineOutputProgram.em are interpreted in a similar way.

The output file, MachineOutputProgram.em, has the same format as the input file, MachineInputProgram.em, so the output of one machine can be used as a static program for another machine. This enables one to compose the results of one or more Effector machines. Using machine composition, a programmer can program a complex task with many small Effector machines that perform simpler tasks.

5. Input and Output Interpreter

Two different methods of programming an Effector machine are defined here. In the first method, called explicit programming, someone explicitly designs a machine architecture, and writes a Static program or Meta program.

The design of a machine architecture and a program, using elicit programming, were explained in sections 2, 3, and 4. Despite the fact that machine instructions for an Effector machine are quite different from a digital computer's machine instructions, explicit programming is analogous to writing a computer program in assembly language, C, or some other programming language for a digital computer.

A second method, called implicit programming, designs the architecture and programs of an Effector machine based on how you want the machine to behave. A method for implicit programming is presented in the next section.

In both explicit programming and implicit programming, the use of an Input Interpreter and Output Interpreter greatly simplify the programming task. In any programming endeavor, the task that needs to be solved, performed or finished can be represented mathematically by an (input, output) set of pairs, $\{(I_1, O_1), (I_2, O_2), \ldots\}$. In some cases, the set, $\{(I_1, O_1), (I_2, O_2), \ldots (I_n, O_n)\}$ is finite. In other cases, it can be infinite. For each i, $I_i$ is the input point, and $O_i$ is the corresponding output point. The (input, output) set specifies the behavior of the Effector machine that we wish to design.

An input and output interpreter translates a chosen pair $(I_i, O_i)$ to the native machine instructions of the Effector machine; specifically, the input interpreter translates the point $I_i$, into a sequence of firing activity executed by the input effectors, $\mathcal{I}$. The output interpreter translates the firing activity of the output effectors, $\mathcal{O}$, into an output point, $O_i$. This output point represents the output of the effector machine. On the attached CD-rom, the input interpreter and output interpreter are designed with C++ source code and can change, depending on what the Effector machine is designed to do. However, an input interpreter can be implemented as a distinct Effector machine. Likewise, an output interpreter can be implemented as a distinct Effector machine.

6. Evolutionary Design of an Effector Machine

Implicit programming on an Effector machine can be accomplished using evolutionary methods. Evolutionary methods for extremely different applications were first introduced by [Box], [Bledsoe], [Bremermann], and [Friedman].

Implicit programming is preferable to explicit programming when the programmer knows what she wants the Effector machine to accomplish, but she doesn't know how to explicitly design the Effector machine architecture, Static program or Meta program. This is analogous to a CEO of a company asking her engineers to build a new computer, but she does not know how to build this computer. The CEO knows how she wants the computer to behave, but does not know how to explicitly build it.

This paragraph introduces some definitions needed to present an evolutionary design process, called Cyclic Graph Evolution. The number of Effector machines in each generation of the evolutionary process is m, where m is an even number. The symbol $p_{crossover}$ denotes the probability that two machines chosen for the next generation will be crossed over. The symbol $p_{mutation}$ denotes the probability that a machine will be mutated. The symbol $\theta$ represents an optimal fitness value. In other words, if an Effector machine has a fitness value greater than $\theta$, then it can competently compute the (input, output) set of pairs, $\{(I_1, O_1), (I_2, O_2), \ldots\}$.

This paragraph presents the primary steps of Cyclic Graph Evolution, which will be abbreviated with the letters, CGE. CGE designs at least one effector machine that competently computes the collection of (input, output) pairs, $\{(I_1, O_1), (I_2, O_2), \ldots, (I_n, O_n)\}$. Build an initial generation of Effector machines, $A = \{\mathfrak{M}_1, \mathfrak{M}_2, \mathfrak{M}_3, \ldots, \mathfrak{M}_m\}$. Determine the fitness of each Effector machine, $\mathfrak{M}_j$. The fitness of $\mathfrak{M}_j$ is determined by its overall ability to represent, $O_i$, with its output effectors, after $\mathfrak{M}_j$'s input effectors receive input $I_i$. The fitness is also dependent on the amount of memory $\mathfrak{M}_j$ consumes and the average amount of computational time that it takes to compute the outputs $O_i$. A smaller amount of memory increases the fitness. A smaller computational time increases the fitness also. During one generation, CGE randomly chooses two machines from the current generation based on their fitness. Sometimes these two machines selected are crossed over and mutated. After a possible crossover and mutation, these two machines are placed in the next generation. The selection of two machines, and possible crossover and mutation is repeated until the next generation has m machines. CGE is repeated until the best Effector machine $\mathfrak{M}_{best}$ has a fitness greater than θ.

The CGE design process is presented below as an algorithm:

Cyclic Graph Evolution Designs Effector Machines

Build an initial population of machines, $A = \{\mathfrak{M}_1, \mathfrak{M}_2, \mathfrak{M}_3, \ldots, \mathfrak{M}_m\}$. while(true)

```
{
    Set G equal to the empty set. (G stores the machines in the
    next generation.)
    For each j in {1,2,3,...,M}
    {
        For each i in {1,2,3,...,n}, find M_j's overall
        ability to represent, O_i,
        with its output effectors, after M_j's input effectors
        receive input I_i.
        Store this ability as the fitness of M_j.
    }
    Set q equal to the number of machines with fitness greater than 0.
    if (q ≧ 1) exit the loop while(true) and return M_best, the
    machine with the highest fitness.
    while( the size of G < m)
    {
        Randomly choose two machines, M_j, M_k, from A for the next
        generation.
        (The probability of choosing M_j, is proportional to its
        fitness.)
        Randomly choose a number r between 0 and 1.
        If r < p_crossover, then crossover machines M_j and M_k.
        Randomly choose numbers s_1, s_2 between 0 and 1.
        If s_1 < p_mutation, then mutate machine M_j.
        If s_2 < p_mutation, then mutate machine M_k.
        Set G equal to G∪{M_j,M_k}.
    }
    Set A equal to G.
}
```

Further Details on Cyclic Graph Evolution

Figure 1:
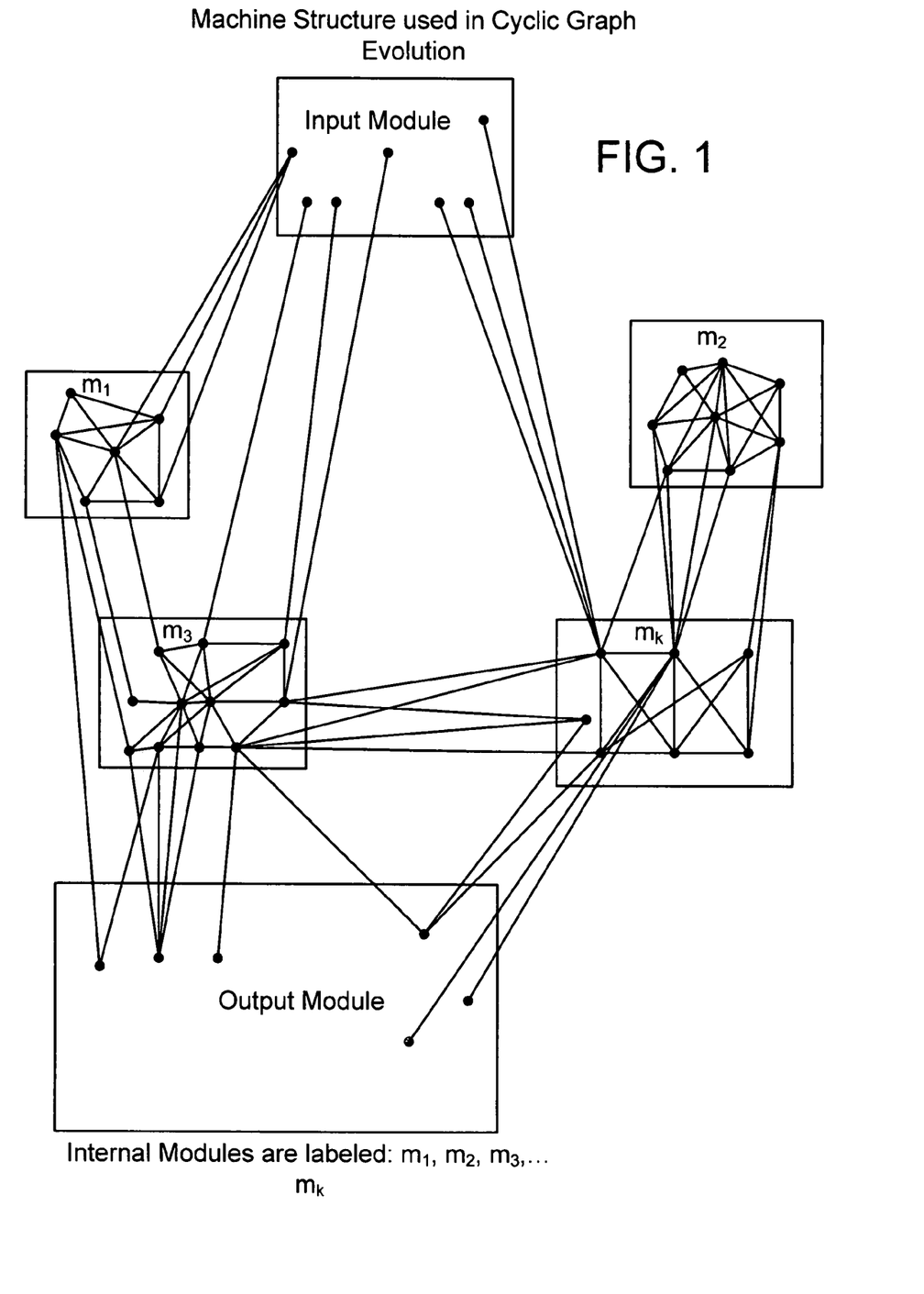

A.) This part covers in further detail the construction of the effector machines in the initial population. Each machine is constructed separately. The structure of how connections and effectors are organized in a machine must be explained first. Each machine that is designed by cyclic graph evolution is composed of one Input module, one Output module, and one or more Internal modules. Refer to the FIG. 1 titled Effector Machine Structure used in Cyclic Graph Evolution. In FIG. 1, internal connections lie completely within one rectangle, which represents one module, Non-zero external connections run from one module to another module. Effectors that have non-zero external connections to other modules are shown as large dots. Although a module may contain multiple effectors, every effector lies in exactly one module. This structure does not affect how the Effector machine computes, as explained in Section 2, but it does affect how two machines are created for CGE, crossed over and mutated. A non-zero connection between two effectors lying in two distinct modules is called an external connection. A non-zero connection between two effectors lying in the same module is called an internal connection.

Please refer to the file EvolutionConstants.xml, stored on the CD-ROM, as we discuss the constants used in the construction of a machine. For each machine created, an Input Module and an Output Module are created. Further, a random number k is chosen such that MIN_MODULES_PER_MACHINE≦k≦MAX_MODULES_PER_MACHINE, and k internal modules are created.

Each module is constructed separately. External connections are added afterwards. For each module, a random u is chosen such that MIN_EFFECTORS_PER_MODULE≦u≦MAX_EFFECTORS_PER_MODULE.

Next, u effectors are created. For each effector, the refractory period is randomly chosen between MIN_REFRACTORY_PERIOD and MAX_REFRACTORY_PERIOD. For each effector, the threshold is randomly chosen between MIN_THRESHOLD and MAX_THRESHOLD. Next, for each effector, a random number v is chosen such that MIN_NUM_CONNECTIONS≦v≦MAX_NUM_CONNECTIONS. This means that v connections are created for this particular effector.

For each of these v connections, the value of the pulse amplitude is randomly chosen between MIN_AMPLITUDE and MAX_AMPLITUDE, inclusive. For each connection, the value of the pulse width is randomly chosen between MIN_PULSE_WIDTH and MAX_PULSE_WIDTH, inclusive. For each connection, the transmission time is randomly chosen between MIN_CONDUCTION_TIME and MAX_CONDUCTION_TIME, inclusive.

B.) This part explains how CGE executes a crossover between two machines, machine A and machine B. Please refer to the FIG. 2 titled, CGE Crossover. The variable $n_1$ represents the number of internal modules in the machine A, and $n_2$ represents the number of internal modules in machine B. For machine A, a random whole number $j_1$ is chosen, lying between LOWER FRACTION NUM MODULES*$n_1$ and UPPER FRACTION NUM MODULES*$n_1$. For machine B, a random whole number $j_2$ is chosen, lying between LOWER FRACTION NUM MODULES*$n_2$ and UPPER FRACTION NUM MODULES*$n_2$.

Figure 2:
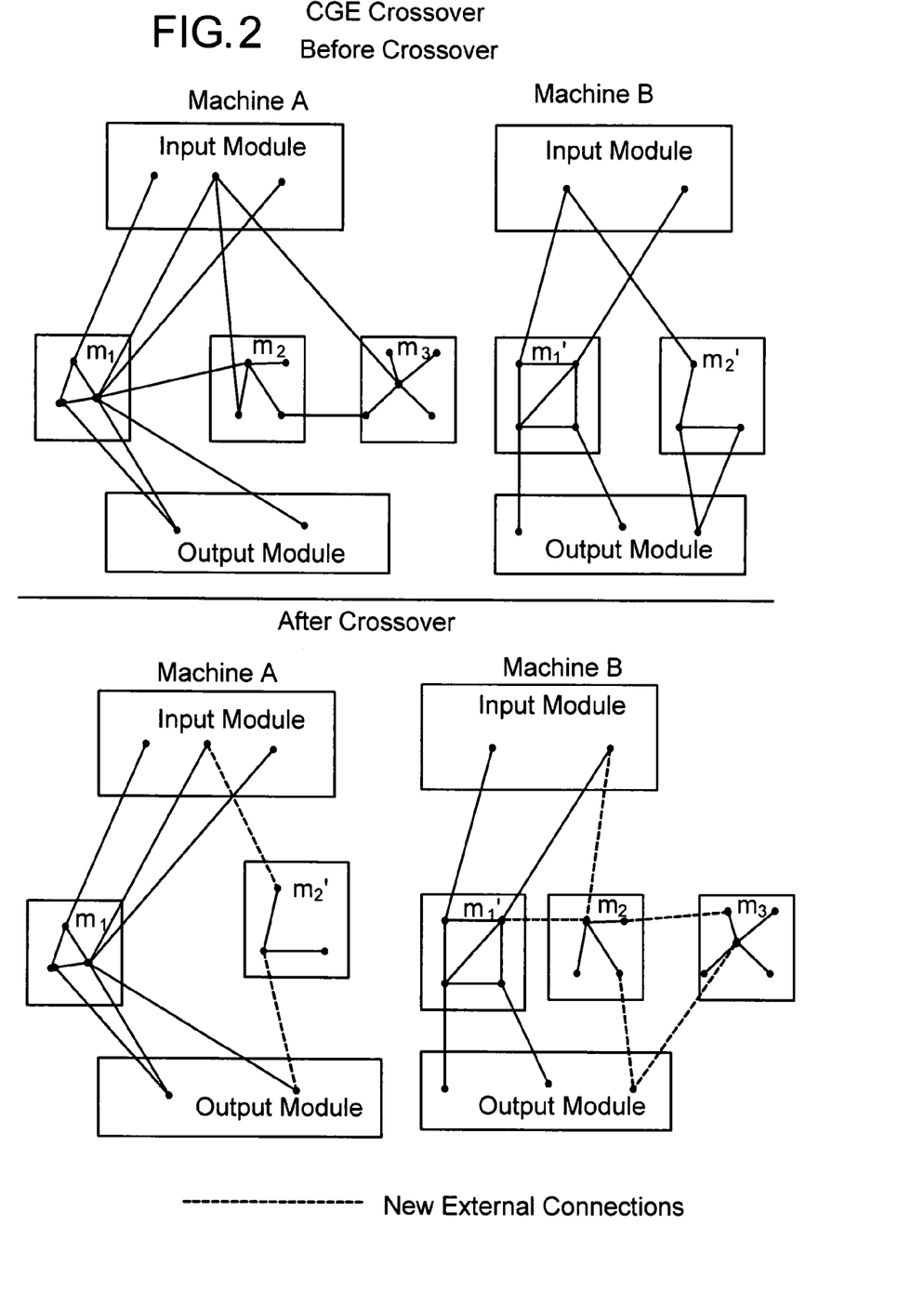

In the FIG. 2, for machine A, $j_1=2$ was selected. For machine B, $j_2=1$ was selected. Since $j_1=2$, two distinct numbers are chosen randomly from the set $\{1, 2, \ldots n_1\}$. For machine A, these two numbers are 2 and 3. Since $j_2=1$, one number is randomly chosen from $\{1, 2, \ldots n_2\}$. In this case, 2 was chosen. What all this means is that internal modules $m_2$ and $m_3$ of Machine A are crossed over with internal module $m_2'$ of Machine B. All the external connections to these modules are also severed. In the diagram, after crossover, new external connections are created and added to the internal modules that were crossed over. Observe that internal connections in a module that is crossed over are not changed or severed after crossover. This is why these objects are called modules. Internal connections are not severed by a crossover.

C.) This part further discusses mutations of an Effector Machine. There are multiple ways to mutate an Effector machine. An effector can be added to a module along with some non-zero connections, connecting the new effector to effectors inside the same module, and possibly connecting it to effectors in different modules. A second type of mutation deletes an effector. In this case, all of the deleted effector's non-zero connections are removed also.

A third type of mutation may change the pulse amplitude, pulse width, or the transmission time of a connection. Similar to adding an effector, a fourth type of mutation adds a new connection. Similar to removing an effector, a fifth type of mutation removes a connection from the Effector machine.

A sixth type of mutation creates a new module containing new effectors and connections between them and connects this new module to other modules with new external connections. A seventh type of mutation deletes a module and removes all of the deleted module's external connections.

The file EvolutionConstants.xml contains constants that guide these seven different types of mutations., In addition, implementations of these mutations in C++ source code are in the directory evolution on the enclosed CD-ROM. Generally, $p_{crossover}$ should usually range from 0.3 to 0.7. Also, $p_{mutation}$ should usually be less than 0.1.

D.) Previous evolutionary methods evolve directed graphs that contain no cycles. Let $V=\{v_1, v_2, \ldots, v_n\}$ be a finite set of n vertices. An edge in a directed graph is an ordered pair $(v_i, v_j)$ with each vertex lying in V. Let $E=\{(v_{i_1}, v_{k_1}), (v_{i_2}, v_{k_2}), \ldots, (v_{i_m}, v_{k_m})\}$ be a finite set of edges. A directed graph is formally, $\mathcal{G}=(V, E)$, where E and V have just been defined.

Figure 3:
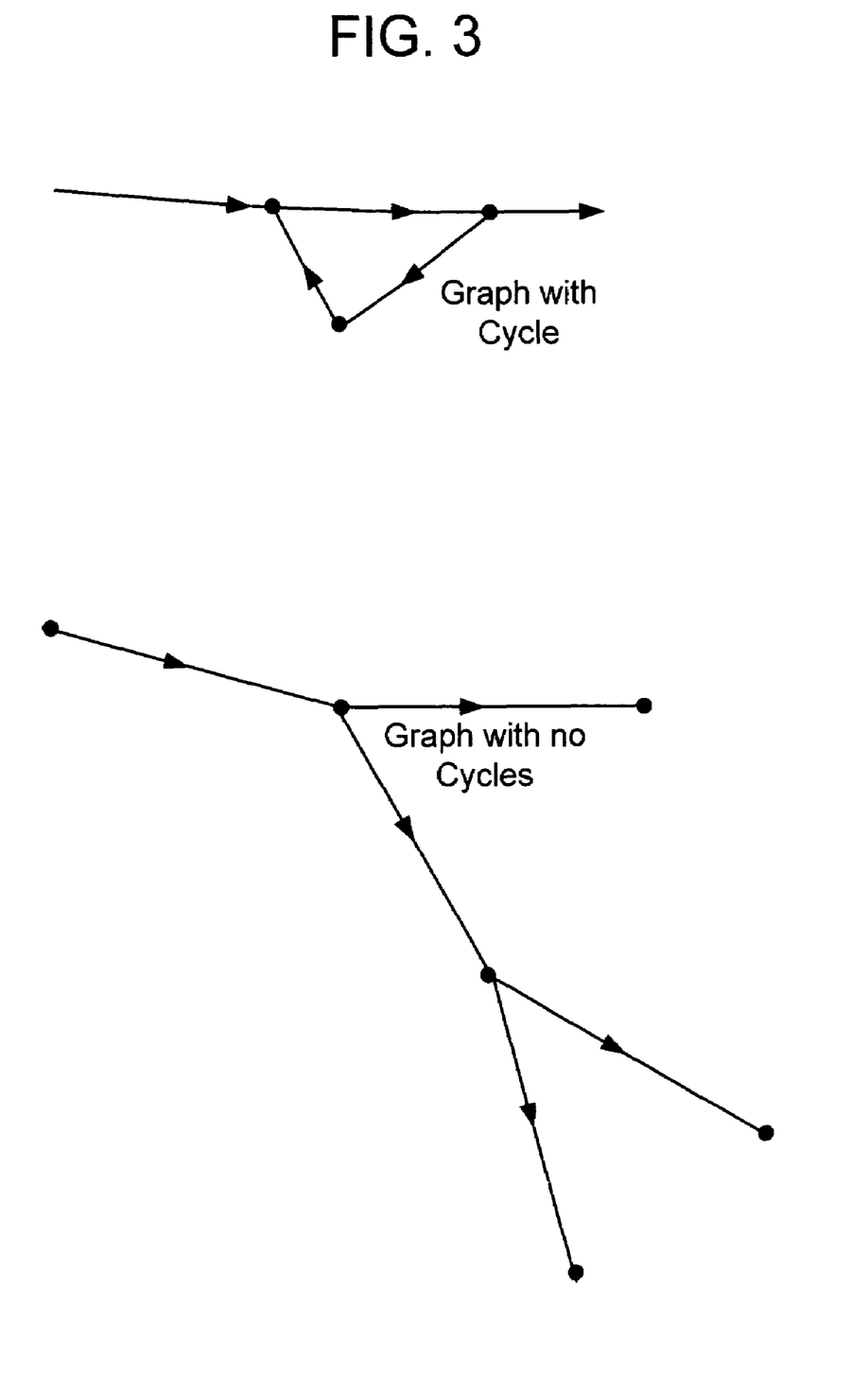

In a directed graph diagram, a dot represents a vertex. A line segment with one arrow pointing from one vertex to the other vertex represents a directed edge. The FIG. 3 titled, Directed Graphs shows one graph that contains a cycle and another that does not contain a cycle so it is called a tree.

A useful analogy is that the structure of hyperlinks on the World Wide Web is a directed graph because it is possible to click on a link to go to web page A, by clicking on a link while at web page B, but not vice versa. In mathematical language, (B, A) is an edge in the directed graph, but (A, B) is NOT an edge.

CGE is the first evolutionary method to evolve directed graphs containing cycles. It is also the first evolutionary method to crossover and mutate these directed graphs containing cycles.

E.) In previous evolutionary methods, each vertex represents a static function. The directed edge represents output from one function delivered as input to the other function. Because of this structure, information does not flow in the opposite direction. Furthermore in a function, the output can not be computed until it receives the input. Consequently, information flows in a synchronized way.

On the other hand, the objects that CGE operates on are entirely different. Effectors have more structure, more flexibility, and more computing capability than functions. Each vertex represents one effector, and each directed edge represents a non-zero connection from effector A to B. Furthermore, it is also possible to have a non-zero connection from effector B to A, so information flows asynchronously in both directions. Most importantly, effectors can change over time, so an effector can mimic the behavior of an infinite number of functions.

F.) CGE can also improve the design of analog VLSI circuits which are suitable for implementing Effector machines in hardware. One of Mead's primary methods of designing subthreshold analog circuits, [MEAD], is to use piecewise linear analysis to design non-linear circuits. Piecewise linear analysis becomes mathematically intractable as the size of the circuit increases. Also, piecewise linear analysis often requires a person to come up with clever techniques for predicting how the circuit will behave. In other words, it is very difficult to write a computer program that could automate the design of these circuits, using piecewise linear analysis. This greatly increases the time and financial cost of designing these circuits. CGE does not require cleverness. One can treat the analog VLSI circuit as a black box. All you need to know is for a set of inputs $\{I_1, I_2, \ldots\}$, what set of corresponding outputs, $\{O_1, O_2, \ldots\}$, are required of the analog VLSI circuit. Then execute CGE on the (input, output) set, $\{(I_1, O_1), (I_2, O_2), (I_3, O_3), \ldots\}$.

7. Hardware Implementation of Effectors

This section addresses the implementation of an Effector machine in hardware; an example is a semiconductor chip. In a hardware implementation of an Effector machine, computation still can be robustly executed even though there may be a small amount of variance in the transmission time or the exact time an effector is supposed to fire. The analysis below explains how to design an effector machine despite substantial variance in the physical parameters of the hardware.

Let r denote the refractory period of an effector. Let $t_{detect}$ denote the time at which effector $E_i$ detects some other effector fired. Let $t_{actual}$ denote the actual time that this other effector fired. To make the analysis simpler to present, we ignore the transmission time from the effector that fired to the effector that received this firing information. Let $\epsilon_i$ denote the maximum possible value for $|t_{detect} - t_{actual}|$. Define $\epsilon = \max\{\epsilon_i : E_i \text{ is an effector in machine M}\}$. If $\epsilon=0$, then all effectors detect when another effector has fired with perfect precision. Let T denote a finite interval of time such that the hardware obeys $0 \leq \epsilon < r < T$. Refer to the FIG. 4, titled Error Tolerance in Effectors.

Figure 4:
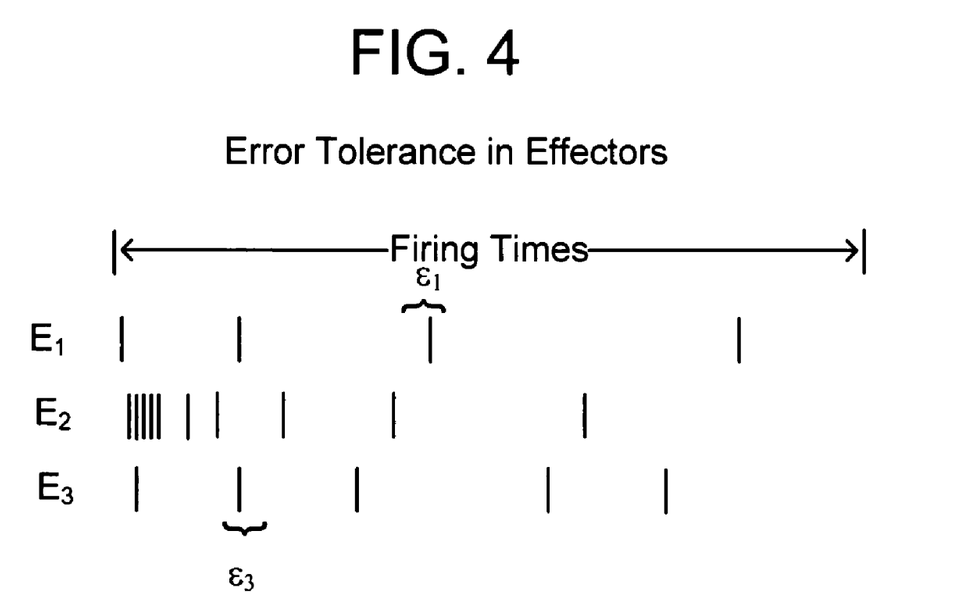

Define $$\chi: \mathbb{N} \times \mathbb{N} \to \mathbb{N} \text{ as } \chi(L, n) =$$

$$L*(L-2)*(L-4) \ldots *(L-2n+2) = \prod_{k=1}^{n} (L-2k+2).$$

As an example, $\chi(7, 3)=7*5*3$. As another example, $\chi(20, 5)=20*18*16*14*12$. Choose T so that r divides T with zero remainder.

The formula:

$$\sum_{n=1}^{\frac{T}{r}} \frac{\chi\left(\frac{T}{r}, n\right)\left(\frac{r}{\epsilon}\right)^n}{n!}$$

is the maximum number of possible distinct firing configurations for an effector, during the interval of time T. This number of firing configurations determines the number of different states that the effector could be in during this time period.

Figure 5:
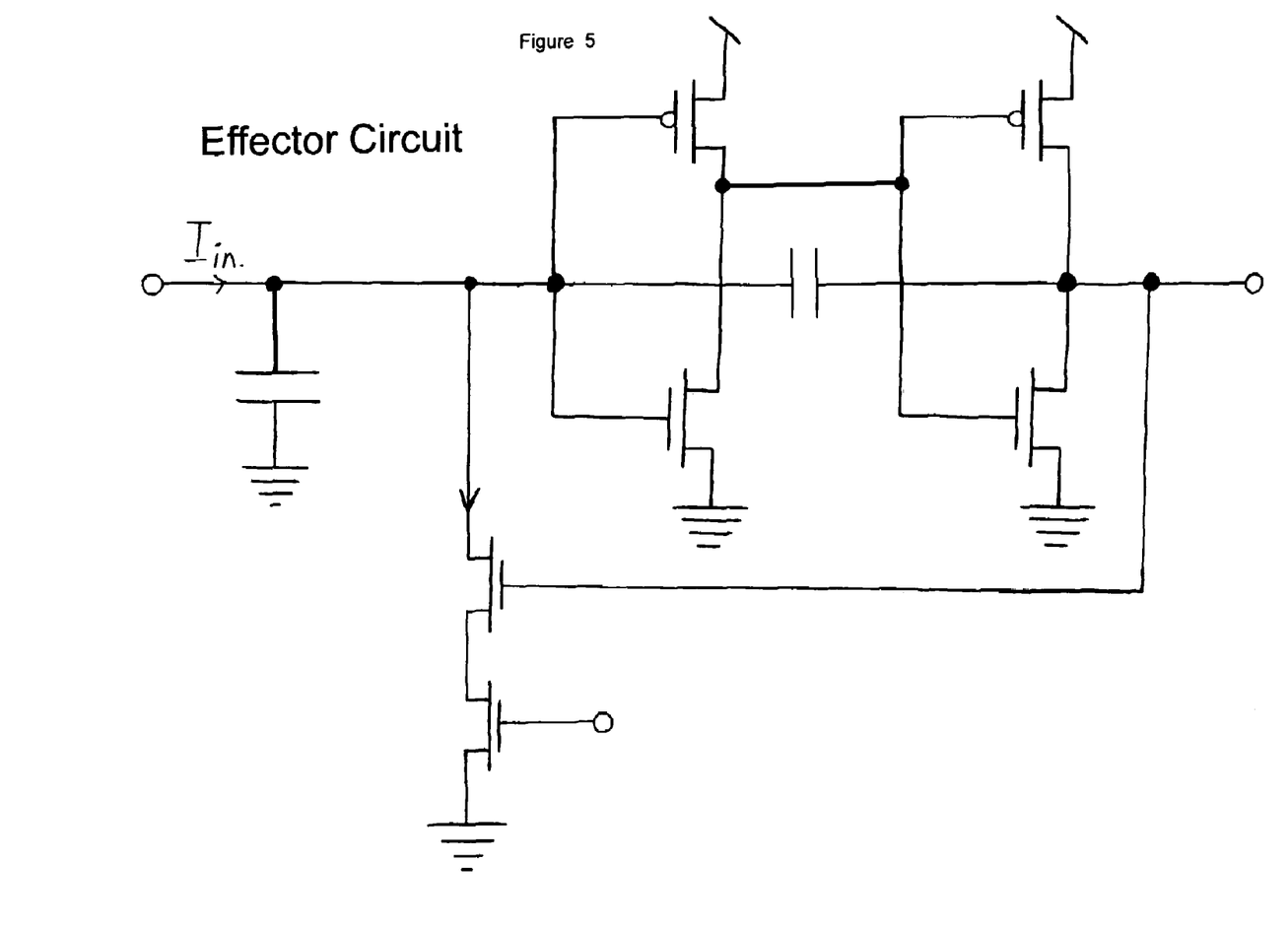

The schematic FIG. 5 titled Effector Circuit illustrates how one Effector can be implemented with a circuit built from transistors that operate subthreshold. This technique reduces the amount of power consumed by more than 5 orders of magnitude. In Carver Mead's words, for a transistor to operate subthreshold means: "The gate voltage at which the mobile charge [in the transistor] begins to limit the flow of current is called the threshold voltage . . . . Most circuits described in this book operate in subthreshold—their gate voltages are well below the threshold voltage," [MEAD]. Furthermore, when transistors operate subthreshold, the amount of heat produced is greatly reduced.

VII. BIBLIOGRAPHY

[Bledsoe] Bledsoe, W. W. (1961)
*The use of biological concepts in the analytical study of systems.*
ORSA-TIMS National Meeting, San Francisco, Calif.
[Box] Box, G.E.P. (1957)
Evolutionary operation: A method for increasing industrial production.
*Journal of the Royal Statistical Society*, C, 6(2), 81-101.
[Bremermann] Bremermann, R. J. (1962)
Optimization through evolution and recombination.
*Self-organizing systems.* pp. 93-106.
Washington, D.C., Spartan Books.
[Friedman] Friedman, G. J. (1959)
Digital simulation of an evolutionary process.
*General Systems Yearbook*, 4, 171-184.
[Mead] Mead, Carver. (1989)
Analog VLSI and Neural Systems.
Addison-Wesley Publishing Company. ISBN 0-201-05992-4
[Rall] Rall, Wilfrid. (1995)
The Theoretical Foundation of Dendritic Function.
MIT Press. ISBN 0-262-19356-6.
[Turing] Turing, Alan M. (1936)
On Computable Numbers, with an Application to the Entscheidungsproblem, *Proceedings, London Mathematical Society*, 2, no 42, 230-265, and no. 43, 544-546.

I claim:

1. A hardware computing machine, which will be referred to as an Effector machine, comprising:
   (a) a collection of hardware computing elements, which will be referred to as Effectors, that are each communicatively coupled to at least one other Effector; and
   (b) a machine architecture that
      adjusts how the Effectors behave, and
      adjusts how information is transmitted from one Effector to another Effector;
         wherein a subset of said Effectors receives information from a Static program.

2. The machine of claim 1, further comprising an input interpreter for designing at least the Static program for the Effector machine.

3. A system comprising a computer readable medium storing thereon one or more instructions that constitute an input interpreter for designing at least:
   a hardware computing machine, which will be referred to as an Effector machine, including at least
      (a) a collection of hardware computing elements, which will be referred to as Effectors, that are each communicatively coupled to at least one other Effector, and
      (b) a machine architecture that
         adjusts how the Effectors behave, and
         adjusts how information is transmitted from one Effector to another Effector;
   the input interpreter outputs a software Effector machine, which is a design for the hardware Effector machine; and
   wherein a subset of said Effectors receives information from a Static or Meta program.

4. The system of claim 3 wherein
   the software Effector machine is a first software Effector machine,
   said input interpreter is implemented with a second Effector machine that includes at least a second collection of software computing elements.

5. A method comprising designing a machine, at least by evolving a graph representing the machine to produce a design of the machine,
   the machine being a hardware computing machine, which will be referred to as an Effector machine, including at least
      (a) a collection of hardware computing elements, which will be referred to as Effectors, that are each communicatively coupled to at least one other Effector; and
      (b) a machine architecture that
         adjusts how the Effectors behave, and adjusts how information is transmitted from one Effector to another Effector:
            wherein a subset of said Effectors receives information from a Static or Meta program.

6. The method of claim 5 wherein the evolving of the graph includes at least performing a crossover of two representations of Effector machines via interchanging representations of modules of the two representations of Effector machines.

7. The method of claim 5 wherein the evolving of the graph is for changing the following properties:
   a number of software modules per software machine,
   a number of software Effectors per software module,
   one or more refractory periods associated with one or more software Effectors,
   one or more thresholds associated with one or more software Effectors,
   a number of software connections,
   one or more amplitudes associated with two or more software Effectors,
   one or more pulse widths associated with two or more software Effectors, and
   one or more conduction times associated with two or more software Effectors.

8. The method of claim 5, wherein said evolving of the graph includes at least changing a number of representations of modules in a representation of the machine.

9. The method of claim 5, wherein said evolving of the graph includes at least changing a number of software Effectors per software module.

10. The method of claim 5, wherein said evolving of the graph includes at least changing one or more refractory periods associated with one or more software Effectors.

11. The method of claim 5, wherein said evolving of the graph includes at least changing one or more thresholds associated with one or more software Effectors associated with the graph.

12. The method of claim 5, wherein said evolving of the graph includes at least changing a number of software connections between two or more software Effectors.

13. The method of claim 5 wherein said evolving of the graph includes at least changing one or more representations of amplitudes associated with one or more representations of Effectors associated with the graph.

14. The method of claim 5 wherein said evolving of the graph includes at least changing one or more representations of pulse widths associated with representations of the Effectors.

15. The method of claim 5 wherein said evolving of the graph includes at least changing one or more representations of conduction times associated with representations of the Effectors.

16. A method comprising: providing a hardware computing machine, which will be called an Effector machine, by at least
   (a) providing a collection of hardware computing elements, which will be referred to as Effectors,
   (b) communicatively coupling each Effector of the collection to at least one other Effector;
   (c) providing a machine architecture that, while the machine is running,
      adjusts how Effectors behave, and
      adjusts how information is transmitted from one Effector to another Effector;
   the method further comprising designing said machine architecture by at least evolving a graph associated with the machine architecture;
   wherein a subset of said Effectors receives information from a Static or Meta program, wherein the Meta program is a program that determines how to change the Effector machine's architecture as the Meta program executes.

17. The method of claim 16 wherein a subset of said Effectors, called Input Effectors, are for receiving information from an external environment.

18. The method of claim 16 further comprising designing the Effector machine via an input interpreter.

19. The method of claim 16 wherein the machine architecture and Effectors are part of a dynamic machine in which parameters of the Effectors are functions of time.

20. The method of claim 19, further comprising configuring a subset of said Effectors, called Output Effectors, for translating at least one firing activity of the Output Effectors into a desired output form.

21. The method of claim 20 wherein
   the collection of hardware computing elements is a first collection of hardware computing elements,
   the Effector machine is a first Effector machine and the translating is performed via an output interpreter that is implemented with a second Effector machine that is constructed from a second collection of hardware computing elements, and
   the first collection of hardware elements and the second collection of hardware elements are different subsets of a third collection of hardware computing elements.

22. The method of claim 19, wherein the dynamic machine is for running a Meta program, which changes, over time, one or more properties associated with one or more of the Effectors, the Meta program being a sequence of sets, each set being a list of values of parameters of Effectors, and each list of values having the parameters in a set order, the machine including at least a portion for receiving the Meta program and converting the Meta program into input for the machine.

23. The method of claim 19 wherein the dynamic machine is for running the Meta program, which changes, over time, a threshold associated with one or more Effectors, the Meta program being a sequence of sets, each set being a list of values of parameters of Effectors.

24. The method of claim 19 wherein the dynamic machine is for running the Meta program, which changes, over time, a refractory, period associated with one or more Effectors, the Meta program being a sequence of sets, each set being a list of values of parameters of Effectors.

25. The method of claim 19 wherein the dynamic machine is for running the Meta program, which changes, over time, a pulse amplitude associated with two or more Effectors, the Meta program being a sequence of sets, each set being a list of values of parameters of Effectors.

26. The method of claim 19, wherein the dynamic machine is for running the Meta program, which changes, over time, a pulse width associated with two or more Effectors, the Meta program being a sequence of sets, each set being a list of values of parameters of Effectors.

27. The method of claim 19, wherein the dynamic machine is for running the Meta program, which changes, over time, a transmission time associated with two or more Effectors, the Meta program being a sequence of sets, each set being a list of values of parameters of Effectors.

28. The method of claim 16, further comprising designing said machine architecture to limit values to which one or more parameters are allowed to be set, based on an error tolerance.

29. The method of claim 28 wherein said designing includes at least configuring transistors to operate at subthreshold based on the error tolerance limiting a range of values that at least one parameter of the Effectors is allowed to be set, operating at subthreshold refers to operating below a gate voltage at which the mobile charge in the transistor begins to limit the flow of current, which is called the threshold voltage.

30. The method of claim 16 further comprising crossing over representations of modules of Effector machines between two representations of Effector machines associated with the graph.

31. The method of claim 16 wherein evolving the graph includes at least changing one or more of the following properties associated with at least a portion of a representation of the machine: a number of software modules per software machine, a number of software Effectors per software module, a refractory period associated with at least one of the software Effectors, a threshold associated with a software Effector, a number of software connections between the software Effectors, an amplitude associated with one or more of the software Effectors, a pulse width associated with one or more of the software Effectors, and a conduction time between at least two of the software Effectors.

32. The method of claim 16 further comprising designing a least one circuit that is associated with the machine by at least evolving a graph associated with the circuit.

33. The method of claim 16 wherein the Effector machine is a first Effector machine and a subset of said Effectors, called Input Effectors, are for receiving information from a second Effector machine.

34. The method of claim 16, wherein the subset of said Effectors, called Input Effectors, are for receiving information from the Static program.

35. The method of claim 16, wherein the subset of said Effectors, called Input Effectors, are for receiving information from the Meta program, the Meta program being a sequence of sets, each set being a list of values of parameters of Effectors.

36. The method of claim 16, wherein the Effector machine is a first Effector machine, the subset of said Effectors, called Input Effectors, are for receiving information from an external environment;
   the Input Effectors are for receiving information from a second Effector machine;
   the Input Effectors, are for receiving information from the Static program; and
   the Input Effectors, are for receiving information from the Meta program, the Meta program being a sequence of sets, each set being a list of values of parameters of Effectors.

37. A hardware computing machine, which will be referred to as an Effector machine, comprising:
(a) a collection of hardware computing elements, which will be referred to as Effectors, that are each communicatively coupled to at least one other Effector; and
(b) a machine architecture that
adjusts how the Effectors behave, and
adjusts how information is transmitted form one Effector to another Effector; wherein a subset of said Effectors receives information from a Meta program, the Meta program being a sequence of sets, each set being a list of values of parameters of Effectors.

38. A system comprising:
the Effector machine of claim 37, and
an output interpreter in addition to the Effector machine, wherein the interpreter is for translating firing activity of a subset of said Effectors into a desired output form.

39. The system, of claim 38 wherein
the collection of hardware computing elements is a first collection of hardware computing elements,
the Effector machine is a first Effector machine and said output interpreter is implemented with a second Effector machine that is constructed from a second collection of hardware computing elements, and
the first collection of hardware elements and the second collection of hardware elements are different subsets of a third collection of hardware computing elements.

40. The system of claim 38, the system being configured such that the interpreter interprets whether an Effector fires as binary information, and interprets the binary information into the desired output form, which includes at least a sequence of symbols.

41. The machine of claim 37 wherein said machine is a dynamic machine in that one or more parameters of the Effectors are functions of time.

42. The machine of claim 41 wherein the machine is for running a the Meta program, which changes, over time, one or more properties associated with one or more of said Effectors, the Meta program being a sequence of sets, each set being a list of values of parameters of Effectors, and each list of values having the parameters,
the machine including at least a portion for receiving the Meta program and for converting the Meta program into input for that machine.

43. The machine of claim 41 wherein the machine is for running the Meta program, which changes, over time, one or more properties of said machine, the Meta program being a sequence of sets, each set being a list of values of parameters of Effectors, the machine including at least a portion for receiving the Meta program and converting the Meta program into input for that machine.

44. The machine of claim 37 wherein said machine architecture comprises hardware having a predetermined error tolerance limiting a range of values to which one or more parameters of the hardware are allowed to be set.

45. The machine of claim 44 wherein the hardware includes transistors configured to operate at or below a gate voltage at which the mobile charge in the transistor begins to limit the flow of current, which is called the threshold voltage.

46. The machine of claim 37 wherein a subset of said Effectors are configured to receive information from an external environment.

47. The machine of claim 37 wherein
the collection of hardware computing elements is a first collection of hardware computing elements,
the Effector machine is a first Effector machine,
a subset of said Effectors are configured to receive information from a second Effector machine that is constructed from a second collection of hardware computing elements, and
the first collection of hardware elements and the second collection of hardware elements are different subsets of a third collection of hardware computing elements.

48. The machine of claim 37 wherein the Effector machine is a first Effector machine, a subset of said Effectors are for receiving information from an external environment;
the subset of said Effectors are for being configured to receive information from a second Effector machine;
the subset of said Effectors are for being configured to receive information from a Static program;
the subset of said Effectors are for being configured to receive information from a Meta program, the Meta program being a sequence of sets, each set being a list of values of parameters of Effectors; and
the subset of said Effectors are for being configured to receive information from any combination of the external environment, the second Effector machine, Static program, and the Meta program.

49. The machine of claim 37, further comprising an input interpreter for designing at least a Meta program for the Effector machine, the Meta program being a sequence of sets, each set being a list of values of parameters of Effectors.

50. A method, comprising forming a hardware computing machine by at least:
(a) providing a collection of hardware computing elements, which will be referred to as Effectors,
(b) providing a machine architecture that
adjusts how Effectors behave, and
adjusts how information is transmitted from one Effector to another Effector;
(c) communicatively coupling each Effector of the collection to at least one other Effector, and
(d) wherein a portion of the hardware computing machine runs a Meta program that sets values for one or more parameters of individual Effectors from the collections of Effectors, the one or more parameters including a time at which information is transmitted from the individual Effectors to another of the individual Effectors.

51. A hardware computing machine, which will be referred to as an Effector machine, comprising:
(a) a collection of hardware computing elements, which will be referred to as Effectors, each Effector of the collection being communicatively coupled to at least one other Effector;
(b) a machine architecture that, while the hardware computing machine is running
adjusts how the Effectors behave and
adjusts how information is transmitted from one Effector to another Effector; and
(c) the hardware computing machine including a portion running a Meta program that sets values for one or more parameters of individual Effectors from the collections of Effectors, the one or more parameters including a time at which information is transmitted from the individual Effectors to another of the individual Effectors.

* * * * *